Oct. 8, 1940.　　　　R. D. JUNKINS　　　　2,217,641
CONTROL SYSTEM
Original Filed July 9, 1937　　3 Sheets-Sheet 1

INVENTOR
Raymond D. Junkins,

Fig. 3

Oct. 8, 1940.　　　R. D. JUNKINS　　　2,217,641
CONTROL SYSTEM
Original Filed July 9, 1937　　3 Sheets-Sheet 3

INVENTOR
Raymond W. Junkins.

Patented Oct. 8, 1940

2,217,641

UNITED STATES PATENT OFFICE 2,217,641

CONTROL SYSTEM

Raymond D. Junkins, Cleveland Heights, Ohio, assignor to Bailey Meter Company, a corporation of Delaware Original application July 9, 1937, Serial No. 152,858. Divided and this application July 26, 1938, Serial No. 221,328

11 Claims. (Cl. 196—132)

This invention relates to the art of measuring and/or controlling the magnitude of a variable quantity, condition, relation, etc., and particularly such a variable condition as the density of a liquid-vapor mixture, although the variable may be temperature, pressure, or any physical, chemical, electrical, hydraulic, thermal, or other characteristic.

My invention is particularly directed to a variable condition such as, for example, the density of a flowing fluid under treatment. The variation in the flowing fluid under treatment may be epitomized as a "condition" change and, for the purpose of this application, it will be understood that a condition change may be either a physical or chemical change, or both, and that the method hereinafter outlined and the apparatus specified is designed to be effective for all such conditions.

"Condition change" refers to a change in the character or quality or condition of a fluid as distinguished from a quantity change such as rate of flow, or change in a position as, for instance, movement of the fluid from one tank to another. Moreover, whenever herein the word "treating" or "treatment" is used, it is to be understood that any acting upon or in connection with a fluid is intended; a fluid is treated when it is heated, when it undergoes chemical change, when two or more varying-characteristic fluids are brought together, when a fluid is electrolized, or when its degree of ionization is changed, as for instance by dilution, change of temperature, etc., and in general, when anything is done in connection with a fluid which is qualitative as distinguished from quantitative.

These terms "qualitative" and "quantitative" have reference to the broadest meaning thereof when used in connection with a definition of what is meant by "condition change"; for instance, the addition to or subtraction of heat from a fluid may merely cause it to expand or contract in size per unit of weight, but this change is nevertheless considered as qualitative rather than quantitative. Similarly, passage of electrical current from one electrode to another immersed in a fluid is considered to effect a qualitative change therein within this disclosure; in short, any phenomenon in a flowing fluid which so evidences itself as to be measured in the manner herein disclosed or in connection with a density determination is deemed to be a "condition change."

Having the foregoing in mind, it will be seen that condition changes may occur as the result of several different operations, sequentially or simultaneously. For instance, considering the change in density which occurs in a flowing fluid, such change may be the result of the heating of the fluid, or of an alteration in the chemical composition of the fluid without heat being imparted thereto, or of an expansion of the fluid while flowing through a treating zone, for instance by changing the volume per unit lineal distance of the space in which the fluid is traveling, or a combination of these effects may cause changes in the density of a flowing fluid with consequent production of a variable which may be used as a basis for fluid processing control. It should not, of course, be overlooked that similar differing conditions may also result in variations in temperature, pressure, and the other factors which vary in a process. Moreover, a temperature change may occur in a fluid entirely because of internal action and without any external subtraction or addition of heat, that is, as a result of chemical action.

I have chosen to illustrate and describe as a preferred embodiment of my invention its adaptation to the measuring and controlling of the density and other characteristics of a flowing heated fluid stream, such as the flow of hydrocarbon oil through a cracking still.

While a partially satisfactory control of the cracking operation may be had from a knowledge of the temperature, pressure and rate of flow of the fluid stream being treated, yet a knowledge of the density of the flowing stream at different points in its path is of a considerably greater value to the operator, but was not available prior to the discovery by Robert L. Rude, as disclosed in his copending application Serial No. 152,860 filed July 9, 1937.

In the treatment of water below the critical pressure, as in a vapor generator, a knowledge of pressure, temperature and rate of flow may be sufficient for proper control, inasmuch as definite tables have been established for interrelation between temperature and pressure, and from which tables the density of the liquid or vapor may be determined. However, there are no available tables for mixtures of liquid and vapor.

In the processing of a fluid, such as a petroleum hydrocarbon, a change in density of the fluid may occur through at least three causes:

1. The generation or formation of vapor of the liquid, whether or not separation from the liquid occurs.
2. Liberation of dissolved or entrained gases.
3. Molecular rearrangement as by cracking or polymerization.

The result is that no temperature-pressure-density tables may be established for any liquid, vapor, or liquid-vapor condition of such a fluid, and it is only through actual measurement of the density of the fluid, or of a mixture of the liquid and vapor, that the operator may have any reliable knowledge as to the physical condition of the fluid stream at various points in its treatment, or when subject to a condition change.

It will be readily apparent to those skilled in the art that the continuous determination of the density of such a flowing stream is of tremendous importance and value to an operator in controlling the heating, mean density, time of detention and/or treatment in a given portion of the circuit, etc. A continuous knowledge of the density of such a heated flowing stream is particularly advantageous where wide changes in density occur due to formation, generation, and/or liberation of gases, with a resulting formation of liquid-vapor mixtures, velocity changes, and varying time of detention in different portions of the fluid path. In fact, for a fixed or given volume of path, a determination of the mean density in that portion provides the only possibility of accurately determining the time that the fluid in that portion of the path is subjected to heating or treatment. By my invention I provide the requisite system and apparatus wherein a determination of such information comprises the guiding means for automatic control of the process or treatment.

While illustrating and describing my invention as preferably adapted to the cracking of petroleum hydrocarbons, it is to be understood that it may be equally adaptable to the vaporization or treatment of other liquids and in other processes. For example, in the distillation of oils, the generation of steam, and other chemical and/or physical processes, wherein a fluid is subjected to a condition change, as for example the heating of a fluid flow path. In particular, the invention relates to the automatic control of the treatment process, and as a specific example thereof I have illustrated and will describe the control of the rate of flow and of the heating in a cracking still.

Figure 1:
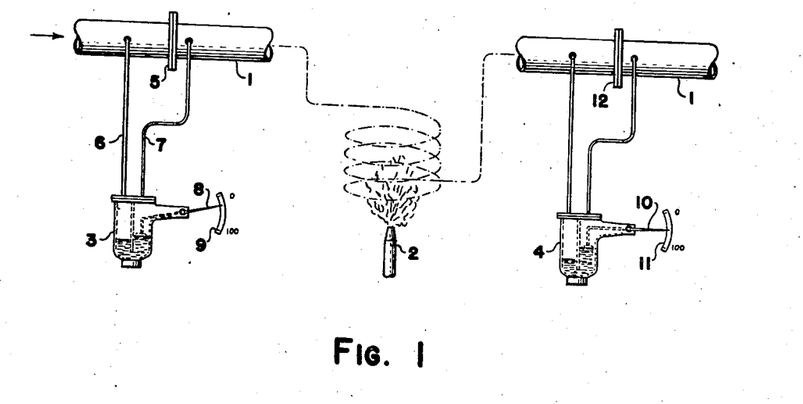
Fig. 1 is a diagrammatic representation of density measuring apparatus for a heated fluid stream.

Referring now in particular to Fig. 1, I indicate therein a conduit 1 which may be considered as comprising the once through fluid path of an oil still wherein a portion of the path is heated as by a burner 2. With such an arrangement the fluid will undergo a condition change and, during such condition change, the density of the fluid will change so that the density at the outlet of the section which is being heated will be different from the density at the inlet of that section. If the section in question is the conversion section in an oil cracking furnace, the condition change brought about by the application of heat may be a physical change, or a chemical change, or a combination of both. The rate of flow of the charge or relatively untreated hydrocarbon is continuously measured by the rate of flow meter, or differential recorder 3, while a differential recorder 4 is located with reference to the conduit 1 beyond the heating means or after the flowing fluid has been subjected to a condition change such as heating or other processing.

While the fluid flow measuring instrumentalities 3 and 4 are illustrated and described as differential pressure responsive devices, it will be understood that such showing and description are illustrative only and not to be taken in a limiting sense, because fluid flow measuring devices such as displacement meters, volumetric meters, Thomas meters, or the like, may be used in the determination of fluid density in practicing the invention herein disclosed.

The float-actuated meter 3 is sensitive to the differential pressure across an obstruction, such as an orifice, flow nozzle, Venturi tube, or the like, positioned in the conduit for effecting a temporary increase in the velocity of the flowing fluid. Such an orifice may be inserted in the conduit between flanges as at 5. The meter 3 is connected by pipes 6, 7 to opposite sides of the orifice 5 and comprises a liquid sealed U-tube, in one leg of which is a float operatively connected to position an indicator 8 relative to an index 9. In similar manner the indicator 10 of the meter 4 is positioned relative to an index 11; the meter 4 being responsive to the differential head across an orifice or similar restriction between flanges 12.

The relation between volume flow rate and differential pressure (head) is:

$$Q = CM\sqrt{2gh} \qquad (1)$$

where

Q = cu. ft. per sec.
C = coefficient of discharge
M = meter constant (depends on pipe diameter and diameter of orifice hole)
g = acceleration of gravity = 32.17 ft. per sec. per sec.
h = differential head in ft. of the flowing fluid.

The coefficient of discharge remains substantially constant for any one ratio of orifice diameter to pipe diameter, regardless of the density or specific volume of the fluid being measured. With C, M and $\sqrt{2g}$ all remaining constant, then Q varies as the $\sqrt{h}$. Thus it will be seen that the float rise of the meters 3, 4 is independent of variations in density or specific volume of the fluid at the two points of measurement and that the reading on the indexes 9, 11 of differential head is directly indicative of volume flow. If the conduit size and orifice hole size are the same at both meter locations, then the relation of meter readings is indicative of the relation of density and specific volume; head varying directly with specific volume and inversely with density. Thus for the same weight rate of flow past the two metering locations the differential head at location 12 will increase with decrease in density of the fluid, and vice versa.

If it is desired to measure the flowing fluid in units of weight, formula (1) becomes:

$$W = CM\sqrt{2ghd} \quad (2)$$

where

W=rate of flow in pounds per sec.
$d$=density in pounds per cu. ft. of the flowing fluid.
$h$=differential head in inches of a standard liquid such as water.
M=meter constant now including a correction between the density $d$ of the flowing fluid being measured and the density of the liquid in the manometer which is some standard such as water.

Assuming the same weight rate of flow passing successively through two similar spaced orifices 5, 12, and with a change in density as may be caused by the heating means 2, then the density at the second orifice 12 may be determined as follows:

$$W_{12} = W_5$$

$$\sqrt{2gh_{12}d_{12}} = \sqrt{2gh_5 d_5}$$

$$\sqrt{h_{12}d_{12}} = \sqrt{h_5 d_5}$$

$$d_{12} = d_5 \times \frac{h_5}{h_{12}} \quad (3)$$

Thus it will be observed that, knowing the density of the fluid passing the orifice 5, we may readily determine the density of the fluid passing the orifice 12 from the relation of differential pressures indicated by the meters 3, 4.

Figure 2:
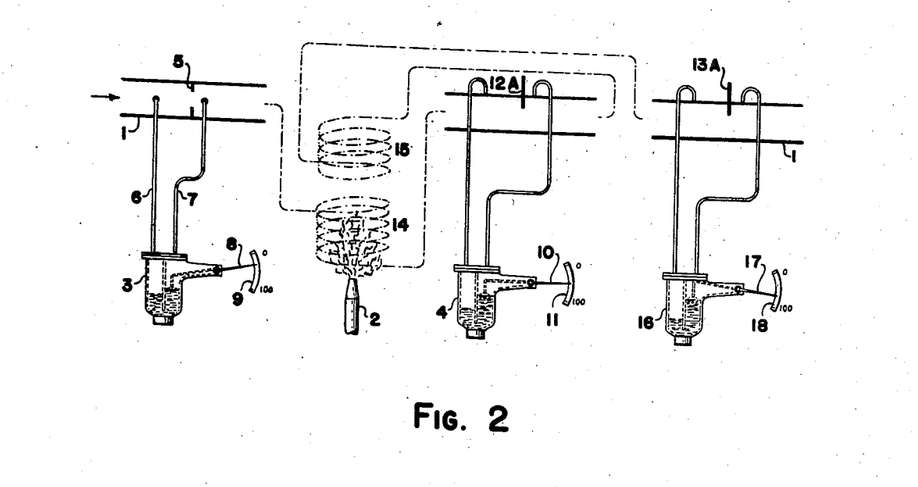
Fig. 2 is similar to Fig. 1 but includes a determination of mean density.

Referring now to Fig. 2, wherein like parts bear the same reference numerals as in Fig. 1, I indicate that after the fluid has passed through the orifice 12A it is returned to a further heating section of the still, from which it passes through a third differential pressure producing orifice 13A. The heating coil 14 will be hereinafter referred to as a first heating section, while the coil 15 will be referred to as a second heating section. In the preferred arrangement and operation of the still the section 15 is the conversion or cracking section, and the one in which it is primarily desirable to continuously determine the mean density of the fluid, as well as the time of detention or treatment in the section. For that reason I now desirably determine the mean density of the fluid in the section 15 and accomplish this through an interrelation of the differential pressures produced by the same weight flow passing successively through the orifices 5, 12A, 13A.

The same total weight of fluid must pass through the three orifices in succession so long as there is no addition to or diversion from the path intermediate the orifice locations. It is equally apparent that in the heating of a petrolum hydrocarbon, as by the coil 14 between the orifices 5 and 12A, there will be a change in density of the fluid between the two orifices, and furthermore that an additional heating of the fluid, as by the coil 15, will further vary the density of the fluid as at the orifice 13A relative to the orifice 12A.

Assume now that the conduit 1 is of a uniform size throughout and that the orifices 5, 12A and 13A are of a uniform opening area and coefficient or characteristic. Through the agency of the meter 16 the differential pressure existing across the orifice 13A is continuously indicated upon an index 18 by an indicator 17. The mean density of the fluid in the conversion section 15 is then obtained by averaging the density of the fluid at the orifices 12A, 13A. As for example:

$$md_{15} = \frac{d_{12A} + d_{13A}}{2} \quad (4)$$

The density of the flowing fluid at the orifice 13A may be obtained in the same manner, relative to the density of the fluid at the orifice 5, as was previously determined (3) for the density of the flowing fluid at the orifice 12A. Simplifying this into a single operation I have:

$$md_{15} = \frac{d_5 \times \frac{h_5}{h_{12A}} + d_5 \times \frac{h_5}{h_{13A}}}{2}$$

$$= d_5 \frac{\frac{h_5}{h_{12A}} + \frac{h_5}{h_{13A}}}{2} \quad (5)$$

Thus the mean density of the flowing fluid in the conversion section 15 (knowing the density or specific gravity of the fluid entering the system) may be directly computed from the readings of the indexes 9, 11, 18. This, of course, on the basis that the orifices 5, 12A, 13A are the same, and that the capacity of the float meters 3, 4, 16 is the same.

Now as the specific volume of a flowing fluid increases progressively from locations 5 to 12A to 13A, the differential pressure across these orifices increases in like manner, and in the operation of such a cracking still it may be that the differential pressure across an orifice 13A will be several times that across the orifice 5 if the orifice sizes are equal. I have, therefore, indicated at 12A, 13A of Fig. 2 that these orifices may be of an adjustable type wherein the ratio of orifice hole to pipe area may be readily varied externally of the conduit through suitable handwheel or other means. Reference may be had to Fig. 16, which shows a sectional elevation of a typical adjustable orifice having a segmental shaped plate 19 projecting across the internal area of the conduit 1 in varying degree depending upon the positioning of the plate 19 through the agency of a handwheel 20.

Such an adjustable orifice per se forms no part of my present invention, and inasmuch as it is an article of commerce readily obtainable in the open market, it is not believed necessary to go into greater detail in regard to its construction and operation.

The actual orifice design in terms of pounds per hour is:

$$W = 360 cfD^2 \sqrt{\frac{\max h}{\text{sp. vol.}}} \quad (6)$$

where

W=lbs. per hr.
D=diameter of equivalent circular orifice hole in inches
$c$=coefficient of discharge
$f$=factor of approach
Sp. vol.=cu. ft./lb.

Now considering that orifice 12A is so adjusted that its $cfD^2$ is different from that of orifice 5, we may then determine the density at 12A as follows:

$$d_{12A} = CR^2$$

where $$C = d_5 \left(\frac{cfD_5^2}{cfD_{12A}^2}\right)^2$$

$$R = \frac{\sqrt{h_5}}{\sqrt{h_{12A}}}$$

$$d_{12A} = d_5 \left(\frac{cfD_5^2}{cfD_{12A}^2}\right)^2 \times \left(\frac{\sqrt{h_5}}{\sqrt{h_{12A}}}\right)^2 \quad (7)$$

In similar manner I may determine the density at the orifice 13A regardless of the orifice area, so long as I take into account the $cfD^2$ of the orifice in the above manner. It will thus be seen that, if the specific volume of the flowing fluid increases so rapidly that the differential head at successive orifice locations (for the same design of orifice) becomes many times the value of the differential head at the initial orifice, it would be impractical to attempt to indicate or record such differential heads relative to a single index or record chart without one or more of the indications or records going beyond the capacity of the index or chart. There are two ready means of overcoming this practical difficulty, the first being an adjustment of the successive orifices, such as 12A, 13A, to have new values of $cfD^2$ such that the indicator or recording pen will be kept on the chart; and the second through varying the basic capacity of the meter 4 or 16 relative to the meter 3. This latter method, comprising so arranging the meter 4, for example, that it requires 50% greater differential pressure to move the related pointer over full index range than in the case of meter 3. This may readily be accomplished by properly proportioning the two legs of the mercury U-tube, on one of which the float is carried. Of course it will be necessary to take such changes in capacity into account when utilizing the differential head readings in determining density or mean density.

For example, the reading of the pointer relative to the index should be on a percentage basis of whatever maximum head the meter is designed for. Then the total head corresponding to the indicator reading will be available or the proper correction may be applied. Assume that the meter U-tube 3 is so shaped that it requires 120″ water differential applied thereto to move the indicator 8 from 0 to 100% travel over the index 9, and that for meters 4 and 16 it requires 250 inch water differential to cause the indicator 10 to move from 0 to 100% over the index 11, and 17 relative to 18. Then:

$F_3 = \%$ float travel of meter 3
$F_4 = \%$ float travel of meter 4

$$\frac{h_5}{h_{12}} = .48 \frac{F_3}{F_4}$$

substituting in (7)

$$d_{12A} = d_5 \left(\frac{cfD_5^2}{cfD_{12A}^2}\right)^2 .48 \frac{F_3}{F_4} \quad (8)$$

and $$md_{15} = \frac{.48 d_5}{2}\left[\left(\frac{cfD_5^2}{cfD_{12A}^2}\right)^2 \frac{F_3}{F_4} + \left(\frac{cfD_5^2}{cfD_{13A}^2}\right)^2 \frac{F_3}{F_{16}}\right] \quad (9)$$

Figure 3:
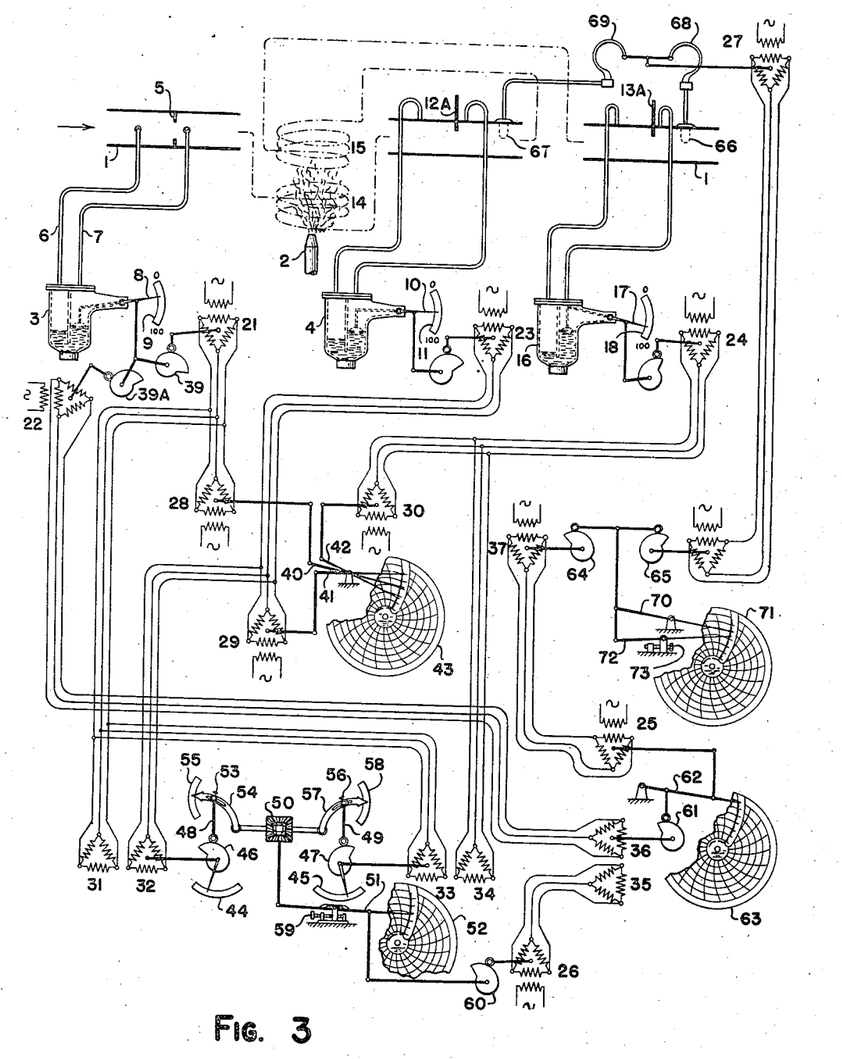
Fig. 3 is a diagrammatic arrangement of the measuring means in connection with a heated fluid stream.

In Fig. 3 I show in diagrammatic fashion the actual mechanism which I preferably employ to obtain indications of mean density, time of detention, etc., valuable as a guide to operation of the system and to actuate automatic control. According to Formula 5 it is necessary in determining the mean density of the conversion section to obtain the ratio of the differential heads at orifices 5 and 12A. Then to obtain the ratio of the differential heads at orifices 5 and 13A. To then average these ratios. I accomplish this result through the use of logarithms, a process well known in mathematics, whereby it is possible to obtain a quotient by subtraction or a product by addition. In connection with logarithmically designed cams I employ self-synchronous motors which lend themselves readily to addition or subtraction through differential windings, as well as having the feature of ready grouping at remote locations.

I indicate such self-synchronous generators for transmission of position at 21, 22, 23, 24, 25, 26 and 27, while the self-synchronous receiving motors are indicated at 28, 29, 30, 31—32, 33—34, 35—36, 37 and 38. The transmitting generator in each case is operated at a suitable angular rotation through the angular positioning of the rotor or single phase field winding. The stator or armature is in each case provided with a 3-phase winding. The field windings of each transmitting generator are energized from a suitable source of alternating current supply.

The operation of systems of this general character for the transmission of angular movement is well-known in the art. Voltages are induced in the 3-phase stator windings of the transmitter or receiver by the single phase field winding on the associated rotor. When the rotor of one of the transmitters is moved from a predetermined position with respect to its stator, a change is effected in induced voltage in the armature winding and the rotor of the receiving motor assumes a position of equilibrium relative to the transmitting generator, wherein the induced voltages in the 3-phase windings are equal and opposite, and consequently no current is set up in the armature winding. If the rotor of one of the generators is turned and held in a new position the voltage is no longer counterbalanced, whereby equalizing currents are caused to flow in the armature windings which exert a torque on the rotor of the receiving motor, causing it to take up a position corresponding to the position of the transmitting generator.

The receiving motors 28, 29, 30 are individually positioned in synchronism with the transmitting generators 21, 23, 24. Between the indicator arm 8 and the transmitting generator 21 I interpose a cam 39 having a rise proportional to the logarithm of its angular motion, to the end that the receiving motor 28 and the recording indicator 40 positioned thereby assume a position corresponding to log $h_5$. Similarly the indicator arm 41 is positioned by the receiving motor 29 in accordance with the value of log $h_{12A}$, while the indicator 42 is positioned in accordance with the value of log $h_{13A}$.

Actually the design is such that the transmitting generator 21 (positioned in accordance with log $F_3$) attains maximum desired rotation with from 10-100% full float travel. No motion of the generator 21 occurs when the float of the meter 3 moves over 0–10% of its travel range. This because it is impossible to have a logarithmic cam start at zero, as the number 0 has no logarithm. Also because the logarithmic characteristics are such that I would have as much cam rise for from 1% to 10% of float rise as from 10% to 100%. Thus I may make the cam 39, and the similar cams of the meters 4 and 16, of practical size and proportion by sacrificing only the first 10% of the float travel of the meters and with the expectation that the operation will not normally be below 10% of full float travel.

In addition to indicating and recording in inter-relation upon the record chart 43 the values of the log of the differential pressures at the three orifices, the position of the transmitting generators 21, 23, 24 is utilized through the agency of differential self-synchronous devices to algebraically add the value of the log $h$ for the different orifices and thus accomplish the ratio operation. Angular movement imparted mechanically to the rotors of the transmitting generators 21, 23 will result in an angular positioning of the rotor of the receiving motor 31—32. Similar action occurs between the transmitting generators 21, 24 and the receiving motor 33—34; and between the transmitting generators 22, 26 and the receiving motor 35—36.

The receiving motors 31—32, 33—34, and 35—36 have 3-phase rotor windings and 3-phase stator windings and are commonly known as differential self-synchronous motors, for in each case they are responsive to two of the transmitting generators and assume a rotor position corresponding in differential effect from the two related transmitters. For example, the receiving motor 31—32 has its rotor positioned responsive to a differential between the position of the rotor 21 and that of the rotor 23, or according to $\log h_5 - \log h_{12A}$, thus performing the mathematical operation:

$$\log \frac{h_5}{h_{12A}} = \log h_5 - \log h_{12A}$$

Correspondingly the receiving motor 33—34 has its rotor positioned responsive to a differential between the position of the rotor 21 and that of the rotor 24, thus performing the mathematical operation:

$$\log \frac{h_5}{h_{13A}} = \log h_5 - \log h_{13A}$$

From Formula 5 the mean density of the fluid in the conversion section is the density of the fluid at orifice 5 multiplied by the average of the ratio of heads for the different orifice locations 12A and 13A. In designing the apparatus I incorporate an average expected value of specific gravity or density of the fluid at the orifice 5 in the transmitted motion of the rotor of 31—32 and of the rotor 33—34. Thus, if the expected density exists at the orifice 5, the indicator moved by the rotor of 31—32 will indicate relative to the index 44 the instantaneous value of $\log d_{12A}$, while on the index 45 may be read the instantaneous value of $\log d_{13A}$.

The rotor of 31—32 angularly moves a cam 46 having a rise proportional to the antilog of its angular motion; likewise the rotor of 33—34 angularly moves an antilog cam 47. Thus the vertical movement of a roller at the lower end of a link 48, riding on the cam 46, is proportional to $d_{12A}$ and that of 49 to $d_{13A}$.

To obtain the mean density through the conversion section 15 it becomes necessary to solve Formula 4, and this I accomplish through a differential mechanism 50 adapted to position an indicator 51 relative to an index and recording chart 52 to continuously record thereon the value of $md_{15}$.

It is to be understood that if the basic capacity of meters 3, 4, 16 vary one from the other, then as previously brought out, this may be taken care of as in (8). The linkage through which the arm 10 positions 23 and the linkage through which the arm 17 positions 24 may incorporate the necessary correction values. Or it might be taken into account as at (9) at the outlet side of antilog cams 46, 47. Furthermore, I have illustrated and described the orifices 12A and 13A as being adjustable as to $cfD^2$ value and (9) such may be taken into account at the same time.

Referring to Fig. 3, I provide at 53—54 means for manually adjusting the effect of angular positioning of cam 46 upon one-half of differential 50. Thus cam 46 which is angularly moved proportional to $$\log \frac{F_3}{F_4} \text{ or } \log \frac{h_5}{h_{12A}}$$

will position the arm 54 relative to the index 55 according to:

$$d_5 \left( \frac{cfD_5^2}{cfD_{12A}^2} \right)^2 \frac{h_5}{h_{12A}} \text{ or } d_{12A}$$

Likewise on index 56 may be indicated $d_{13A}$. The differential 50 then positions the arm 51 according to $$\frac{d_{12A} + d_{13A}}{2}$$

or $md_{15}$.

At 59 I indicate a manual adjustment of the motion of arm 51 to take into account deviations in value of $d_5$ of (9) from design conditions, as might be attributed to changes in specific gravity, temperature, etc.

The arm 51 is adapted to position a logarithmic cam 60 for moving a transmitter 26 proportional to $\log md_{15}$. The meter 3 positions a cam 39A for moving a transmitter 22 proportional to $\log \sqrt{h_5}$, which so long as $d_5$ remains constant equals $\log W$ where W is rate of flow in pounds. The differential motor 35—36 is then under the influence of the transmitters 22, 26 representative of $\log W$ and $\log md_{15}$ and the resulting angular motion of cam 61 is:

$$\log T = \log md_{15} - \log W$$

Cam 61 is of antilog design and the arm 62 is moved relative to record chart 63 to indicate the time of detention or treatment of any particle of fluid in the heating section 15, from:

$$T = \frac{V md_{15}}{W}$$

where

T = time any particle is in section 15.
V = volume between 12A and 13A (cu. ft.)
$md_{15}$ = mean density (lbs. per cu. ft.)
W = rate of flow (lbs. per unit T)

The position of the arm 62 is used to angularly position a transmitter 25, in turn positioning a receiver 37 and cam 64. Closely related is a cam 65 positioned by a receiver 38 under the control of a transmitter 27 responsive to mean temperature of the fluid mixture. Temperature responsive bulb 66 is located in the fluid at the outlet of the heating section 15, while bulb 67 is located at the inlet to the section. The corresponding Bourdon tubes 68, 69 are arranged to position the transmitter 27 according to the mean temperature of the fluid through the section 15. The cams 64, 65 may be designed as uniform rise cams or to take care of any characteristics or relationship as may be desired. Through their interrelation an indicator 70 is continuously positioned relative to an index and recording chart 71 to advise the time-temperature relationship for the conversion section 15.

An indicator pen 72 is positioned with the indicator 70 by the time-temperature relation but is further provided with a stock factor adjustment 73 so that the pen 72 records on the chart 71 the yield per pass. The stock factor adjustment 73 is available to correct for deviations in specific gravity, anilin number, and such other variables as may affect the charge or fluid entering the conduit 1.

Figure 4:
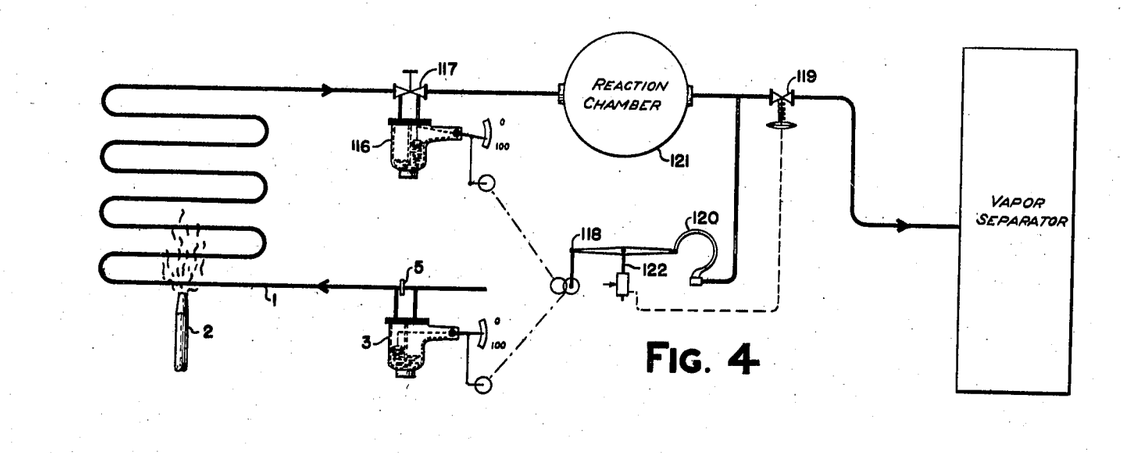
Figs. 4 and 5 illustrate a control of the fluid flow in an oil refining process.
Figure 5:
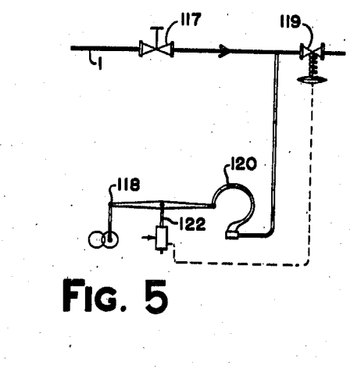

In Figs. 4 and 5 I indicate the various self-synchronous transmitters and receivers of Fig. 3 as circles and the numerous interconnecting wires merely by dot-dash lines for the sake of simplicity on the drawings. In Figs. 4 and 5 I indicate pipes transmitting loading air pressures by short dash lines to avoid confusion.

In Fig. 4 I illustrate a determination of density at a location 117 or the exit of a heating coil, and the utilization of such density determination as a loading means for back pressure control on the reaction chamber. The density at the tube outlet 117 may vary not only through variations in back pressure but also through variations in heat and for other causes within the coil. The density determination is effective to establish a new back pressure standard which the back pressure valve 119 then automatically maintains. A floating member 118 has its left-hand end positioned in accordance with value of density at the location 117. The right-hand end is positioned by a Bourdon tube 120 sensitive to pressure in the flow path between the back pressure valve 119 and the reaction chamber 121.

The diaphragm of the back pressure valve 119 is under the control of a pilot 122 normally positioned by the Bourdon tube 120 responsive to pressure in the line ahead of the valve 119. For example, should the back pressure at this point change, then the Bourdon tube responsive to such pressure will position the pilot 122 to control the valve 119 for returning the pressure to predetermined value.

The reason for determining density at location 117 is to position the left-hand end of the member 118 to establish a new back pressure standard to which the valve 119 then automatically works through the agency of the Bourdon tube 120 should said density vary from other causes, such for example as variation in firing. The principal object in maintaining a constant density at the location 117 (the outlet of the coil) is because this predicates a constant heat supply in the fluid and this is of particular importance where there is a reaction chamber in the system. If the density and correspondingly the total heat should vary through change in heating of the coil, the tendency will be toward giving the reaction chamber the same amount of heat although it may not necessarily be brought back to exactly the same amount; however, in an attempt to maintain the heat supply as uniform as possible I exert a stabilizing effect upon the entire system operation.

The density at the location 117 may vary not only through variations in back pressure, but also through variations in heating of the coil and for other causes within the coil. Assume for the moment that the density at location 117 is 10 and the back pressure at the valve 119 is 300. Now if the density (through variation in the heating or variation in some other factor or rate of charge) should increase to a value of 12, then obviously if I desire to maintain this density constant at 10 I must relieve some of the back pressure effective at the point 119. Thus I must vary the setting of the back pressure valve 119 to hold some lesser figure than 300, as for example 250. This is accomplished because the change in density from 10 to 12 at location 117 moves the left-hand end of the member 118 and thus establishes a new pressure standard to which the back pressure valve 119 must work.

The instrumentalities as above discussed in connection with Fig. 4, whereby a constant density may be maintained at location 117 or the outlet of the tube in which the fluid is heated, may also be utilized to insure a desirable heat supply in that fluid.

Accordingly, one particular field in which the present invention is particularly useful is in connection with a fluid treating system wherein the fluid, after being treated in one zone,—for instance, in a heating coil,—then passes into another zone, for example, an enlargement wherein the velocity is reduced without material change in pressure, such for instance as a chamber or an enlarged tube section, of relatively quiescent nature and wherein the fluid may or may not be subject to additional heat or treatment from an external source. The density of a fluid at the outlet of any zone wherein the fluid has been treated is a function of the change in heat content or of the total heat of that fluid irrespective of whether such heat is latent or sensible.

In the above discussion and elsewhere herein, the term "latent heat" is used to mean that heat absorbed or liberated required to maintain a substance or substances undergoing physical and/or chemical change at a constant temperature. Obviously, this "latent heat" does not include that heat necessary to maintain a substance at a constant temperature through heat interchange with other substances, but is "heats" commonly defined as—heat of cracking (the reaction of which is generally considered endo-thermic); heat of polymerization (the reaction of which is generally considered exo-thermic); heat of vaporization, transition, fusion, sublimation, reaction, solution, absorption, etc.

Such heat supply is of particular importance when the fluid is to be thereafter passed through a reaction chamber wherein certain phenomena are secured wholly as the result of the heat already contained in that fluid and without having any additional heat imparted thereto. Such control is also desirable when the treating coil does not feed into a reaction chamber; that is, when the heated fluid is passed directly to a vapor separator. Under the latter conditions, a knowledge of the density at the outlet of the conversion section, permits an associated control of the total heat which is in the fluid as the latter passes into a vapor separator; in other words, when the reaction chamber shown in Fig. 4 is omitted.

It has been found, for instance, that this control is of particular value when the residuum from the vapor separator is withdrawn to a vacuum unit for further treatment because even under these conditions it is possible closely to control the heat which governs the distillation effected in the vapor separator. Under either of the last-discussed conditions the control as to pressure would be as shown in Fig. 5.

In some industries, (following the terminology of the petroleum industry) the second zone is termed a "reaction" chamber, wherein without further treatment, as for instance without further heat being imparted to the fluid, the latter undergoes a change of condition. It has always been difficult in the past, because of the lack of some control element whereby, what was occurring, could be observed as "news rather than history," so to treat, that is, so to apply heat to a fluid in a treating zone (such as a heating section), that optimum operating conditions would exist in another zone to which the fluid (after being treated) is passed, such for instance as the just described enlarged zone, whether the latter is a "reaction" chamber or merely a section in which the tubing is of enlarged diameter as compared with the diameter of the heating section tubing.

Another form of fluid treating apparatus to which the present invention is applicable is one wherein, after the fluid has been treated in a zone, such as a heating coil, it passes to a coil of enlarged diameter, or one wherein the velocity is reduced without material change in pressure. Such apparatus and system differs from the hereinbefore described reaction chamber system only in that heat is imparted to the fluid from an external source. For example, in Fig. 3 the fluid leaving coil 14 passes into coil 15 in which latter additional heat is imparted to the fluid and wherein the device 4—12A is utilized in the determination of density of the fluid leaving the zone 14. In some cases a pipe in a section, such as 15, may be of greater diameter than a pipe in the section 14, and in other cases it may be the same.

It will be understood, therefore, that through the instrumentality of the present invention as applied in the present instance, one may use the determined density in arriving at the total heat or change in heat in a fluid irrespective of the character of that heat and utilize this determination in controlling the operation of the fluid treating system, either so far as causing the heat to exist in the treated fluid or thereafter utilizing the heat which does exist therein.

Certain features in connection with the heat-density relation and utilization thereof, disclosed but not claimed herein, are disclosed and claimed in the co-pending application of Robert L. Rude, Serial No. 152,860, and the co-pending application of Rude and Read, Serial No. 152,861, both filed July 9, 1937.

In the event that the treating coil is not equipped with a reaction chamber but feeds directly to a separator, it may be desirable to control the density at the outlet of the coil for the purpose of controlling the total heat to the vapor separator. This is particularly important in the event that the residuum from the vapor separator is being withdrawn to a vacuum unit for further reduction to specification asphalt, inasmuch as such heat control governs the distillation effected in the vapor separator. In Fig. 5 I show a modification of Fig. 4 wherein the arrangement is similar to that of Fig. 4 except that the reaction chamber is herein omitted.

While I have chosen to illustrate and describe the functioning of my invention in connection with the heating of petroleum or hydrocarbon oil, it is to be understood that the method and apparatus is equally applicable to the treatment, processing, or working of other fluids, such for example, as in the vaporization of water to form steam. If the fluid entering the conduit 1 is water, heated and/or vaporized by the heating means 2, the condition change or processing of the fluid being treated is believed to be purely a physical change.

Other fluids than water may, of course, be treated or processed, or undergo a physical condition change manifested by a change in density. The apparatus arrangements of Figs. 1 and 2 clearly exemplify the invention regardless of the type or nature of the fluid being processed and regardless as to whether the "condition change" is physical, chemical, or both, in nature. Likewise other figures of the drawings illustrate apparatus readily adaptable to the processing of fluids other than petroleum hydrocarbons and wherein the condition change may be of a strictly chemical or of a strictly physical nature, or a combination of the two.

Referring, for example, to the arrangement of Fig. 4, if the fluid being processed is water heated and passed to the chamber 121 (in this case usually termed a flash chamber) the heated fluid entering chamber 121 may be all liquid or a liquid-vapor mixture. Upon entering the enlarged relatively quiescent zone 121 wherein there may be a reduced pressure, a considerable percentage of the liquid will flash into vapor; the vapor then passing to other apparatus.

In general, the arrangement of apparatus and method of its operation and utilization is adaptable to fluids undergoing physical, chemical or physical and chemical condition changes, so that while I have used the processing of petroleum hydrocarbon as a specific example, I am not to be limited in that respect whatever.

This application is a division of my application Serial No. 152,858 filed July 9, 1937, entitled Control systems and co-pending.

What I claim as new, and desire to secure by Letters Patent of the United States, is:

1. In an oil processing apparatus, in combination, a heated fluid flow path discharging into a reaction chamber, means for determining the density of the fluid at the entrance to the reaction chamber, pressure responsive means at the exit of the reaction chamber, and means controlling the pressure of the fluid at the exit of the reaction chamber responsive to both said density and said pressure means.

2. In an oil processing apparatus, in combination, a once through flow path for the fluid to be processed, heating means for the path, means supplying fluid under pressure to the entrance of the path, a flow responsive element at the entrance to the heated path, a flow responsive element at the exit of the heated path, means correlating the manifestations of the flow responsive elements to evaluate changes in the density of the fluid leaving the path, means sensitive to pressure of the fluid leaving the path, and control means positioned by said last two named means and adapted to regulate fluid pressure in the path.

3. In combination, a forced circulation fluid flow path, heating means for the path, means supplying a pressure flow of liquid to the path, a differential pressure responsive device at the entrance to the path, a similar differential pressure responsive device at the exit of the path, means correlating the positionings of said devices and positioning a member in accordance with changes in the density of the fluid leaving the path, means sensitive to pressure of the fluid leaving the path, control means for such pressure, and means responsive to said member and to said pressure sensitive means for positioning the control means.

4. In an oil processing apparatus, in combination, a once through flow path through which a selected fluid to be processed passes, heating means for the path, means continuously determining the density of the selected fluid leaving the path and establishing thereby a back pressure standard to be maintained on the path, means sensitive to back pressure at the exit of the path, and means adapted to control said back pressure and responsive to the back pressure standard and to the back pressure actual.

5. In an oil processing apparatus for processing a selected oil, in combination, a forced circulation path comprising a treating zone, heating means for the zone, a vapor separator to which the selected oil discharges from the flow path, and means responsive to density and pressure of the selected oil in the path controlling the heat in the selected oil entering the vapor separator to govern the distillation effected therein.

6. In an oil processing apparatus for processing a selected oil, a heated fluid path for the oil, means for determining the in situ density of the selected oil at the exit of the heated path, means for determining the pressure of the oil at the same location, and pressure regulating means of the oil at that location conjointly responsive to said first and second means.

7. In an oil processing apparatus, a heated fluid path for the oil, means for determining changes in the in situ density of the oil at the exit of the heated path, means for determining the pressure of the oil at the exit of the heated path, and pressure regulating means of the oil at the exit of the heated path conjointly responsive to said first and second means.

8. In combination with a fluid heater having a once through fluid flow path into which a selected fluid is admitted, means continuously determining the in situ density of the selected fluid at the exit of the heater, and means controlling back pressure on said path positioned by said first named means.

9. In combination with a fluid heater having a once through fluid flow path into which a fluid is admitted, means continuously determining changes in in situ density of the fluid at the exit of the heater, means controlling back pressure on said path positioned by said first named means.

10. Apparatus for controlling the pressure of a selected fluid at a location in a heated fluid flow path through which the selected fluid flows, comprising in combination, means for determining the in situ density of the selected fluid at said location, means for determining the pressure of the fluid, and means controlling the pressure of said fluid responsive to both said means.

11. Apparatus for controlling the pressure of a selected fluid at a location in a heated fluid flow path through which the selected fluid flows, comprising in combination, means for determining changes in the in situ density of the fluid at said location in the heated fluid flow path, means for determining the pressure of the fluid, and means controlling the pressure of said fluid responsive to both said means.

RAYMOND D. JUNKINS.